United States Patent [19]

Tolomei

[11] Patent Number: 5,046,026

[45] Date of Patent: Sep. 3, 1991

[54] METHOD AND APPARATUS FOR PRECISELY VARYING THE DISPLAY RATE OF COMPUTER GENERATED GRAPHIC IMAGES

[75] Inventor: Victor Tolomei, Milpitas, Calif.

[73] Assignee: Sun Microsystems, Inc., Mountain View, Calif.

[21] Appl. No.: 365,532

[22] Filed: Jun. 13, 1989

[51] Int. Cl.$^5$ .............................................. G09G 1/00
[52] U.S. Cl. .................................................... 364/521
[58] Field of Search ...................... 364/518, 521, 522; 340/725–727, 723, 747, 750; 307/510, 518, 590; 358/240, 244.1, 244.2

[56] References Cited

U.S. PATENT DOCUMENTS

| | | | |
|---|---|---|---|
| 3,700,792 | 10/1972 | Harrison, III et al. | 340/725 X |
| 3,937,878 | 2/1976 | Judice | 340/724 X |
| 4,045,789 | 8/1977 | Bristow | 340/725 |
| 4,864,287 | 9/1989 | Nishi et al. | 340/725 |

Primary Examiner—Heather R. Herndon
Attorney, Agent, or Firm—Blakely Sokoloff Taylor & Zafman

[57] ABSTRACT

A method and apparatus for precisely varying the display rate of computer generated graphic images. These images are generated by a computer system. The images are made up of a plurality of individual cells. Each cell is a picture of the object at a different point in time. With the present method, the user inputs the desired display rate into the computer system. The computer then converts this display rate into a vector located in the first quadrant of an x,y coordinate system. In this system, the x-axis represents increasing time and the y-axis represents cell number. The vector is displaced away from the x-axis through an angle. Theta is a predetermined function of the previously entered display rate. The first cell in the image is displayed, and the computer waits for a fixed interval of time. After this wait period, the computer uses a simple algorithm to check the height of the vector above the x-axis. If the vector is above a specified height, then the next cell is displayed. Otherwise, the computer displays the current cell for an additional fixed interval of time, and then repeats the check of the vector height. The steps of displaying the image and checking the height of the vector above the x-axis is repeated for all cells in the image. If display is to continue after this point, the cells are shown over again in the same color.

11 Claims, 4 Drawing Sheets

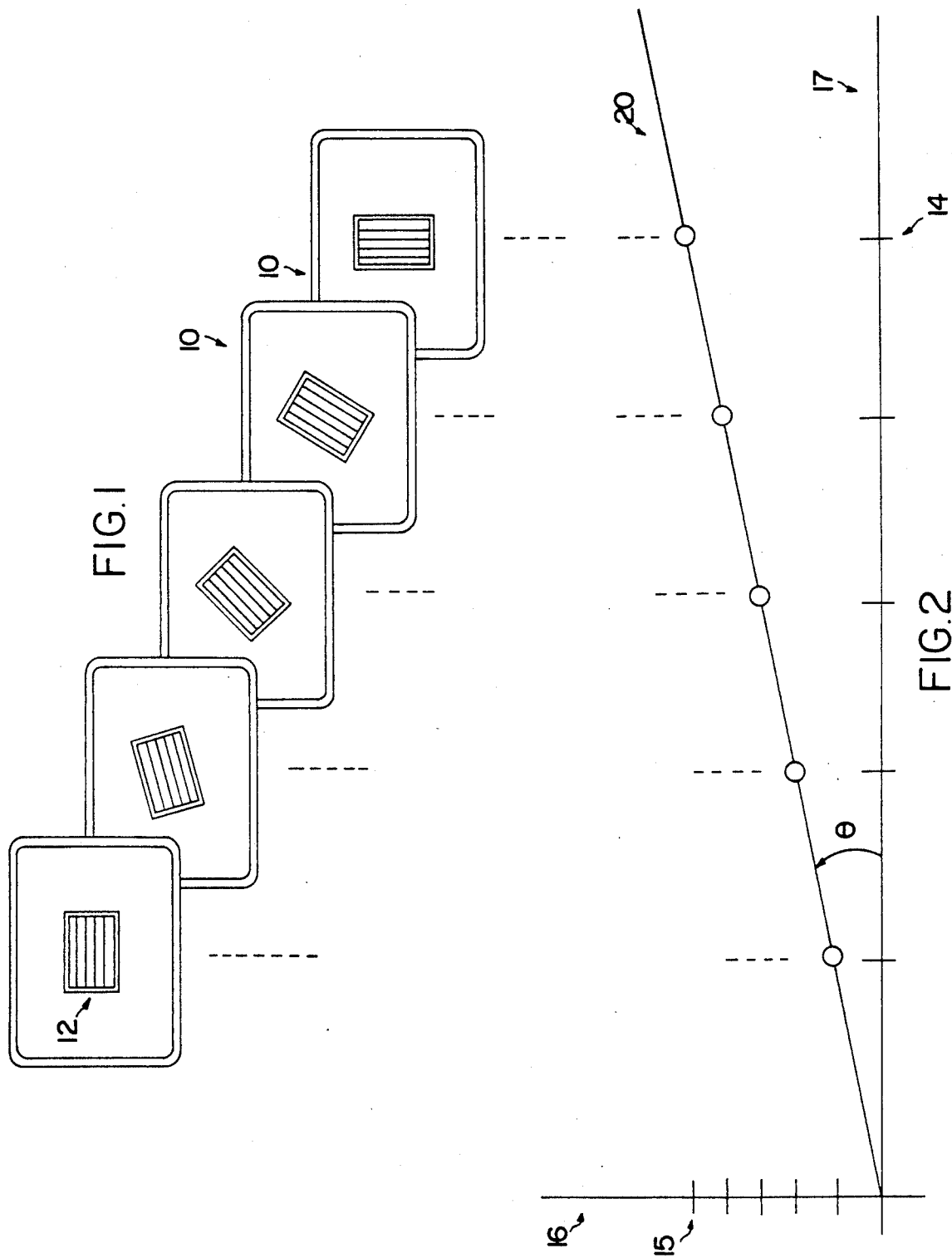

METHOD AND APPARATUS FOR PRECISELY VARYING THE DISPLAY RATE OF COMPUTER GENERATED GRAPHIC IMAGES

BACKGROUND OF THE INVENTION

1. Field of the Invention

The present invention relates to computer graphics displays and more particularly to a method and apparatus for precisely varying the display rate of computer generated graphic images.

2. Art Background

In the field of computer graphics, it is often desirable to have a means for displaying animated images. With an animated display, the graphic image which is generated by the computer varies over time. Animated displays are useful in many different fields. For example, they allow a computer user to visually see how a particular object will change in response to an external stimulus. Particular applications can be found in the field of medicine where an animated display can be used to dynamically "watch" the operation of internal organs over time with the use of a device such as a CAT scanner.

Typically, an animated image is made up of a series of individual static pictures known as cells. Each cell is a rendering of the object "frozen" at a given point in time. The individual cells are sequentially flashed on the computer's video display. Each image is displayed for only a short period of time. When the entire sequence of images is viewed in real time, it appears that the object is moving. The process is similar to the manner in which animated cartoons are created.

In prior art devices, the animation sequence could only be displayed at a single fixed rate or at a very restricted set of variable rates. This limitation arose because of the hardware design of the graphics devices. The amount of time in which the images were displayed was fixed. Thus, a user could not arbitrarily slow down or speed up the animated sequence as he desired. In many instances, it is desirable to be able to change this display rate in a precise smooth and arbitrary manner. For example, if an object changes very quickly over time, a fast display rate may prevent all the details of the object from being observed. With a slower display rate, more details can be seen when using prior art devices, although a user may miss important changes in the object due to the limitations of the display device. If there was a method for varying the display rate smoothly and arbitrarily, the user would be able to slow down the animated sequence and properly observe the object.

As will be described, the present invention overcomes the limitations found in the prior art, and provides a method for precisely, smoothly, and arbitrarily varying the display rate of computer generated graphic images.

SUMMARY OF THE INVENTION

The present invention overcomes these limitations by providing a method and apparatus for precisely, smoothly, and arbitrarily varying the display rate of computer generated graphic images. With the present invention, a computer user is able to accurately slow down an animated sequence so that a quickly varying object can be more closely observed or accurately speed up a slowly varying object. In the present invention, a user inputs a desired display rate of arbitrary precision to a computer system, the computer then uses this desired display rate to calculate when each sequential image should be displayed. The present invention uses a fixed interval of time during which each image is displayed. Thus, in order to slow the display rate, the present invention chooses particular images, according to the desired display rate, and displays them for more than one display interval. In this manner, it appears to the user that the display rate is slowed down.

In its broadest configurations, the present invention comprises a method of smoothly varying the display rate of animated graphic images. These images are generated by a computer system. The images are made up of a plurality of individual cells. Each cell is a picture of the object at a different point in time. With the present method, the user inputs the desired display rate into the computer system. The computer then converts this display rate into a vector located in the first quadrant of an x,y coordinate system. In this system, the x-axis represents increasing time. The y-axis represents cell number. Thus, in a broad sense, the slope of this line, or the first derivative, can be viewed in the following terms:

$$\text{Slope} = \frac{d \text{ cell}}{dt}$$

which is proportional to the display rate in cells per second. The vector is displaced away from the x-axis through an angle theta. Theta is a predetermined function of the previously entered display rate. The first cell in the image is displayed, and the computer then waits for a fixed interval of time. After this waiting period, the computer uses a simple algorithm to check the height of the vector (i.e., the y coordinate) above the x-axis at the current time location. If the vector is above a specified height, then the next cell is displayed. Otherwise, the computer displays the current cell for an additional fixed interval of time, and then repeats the check of the vector height always moving rightward on the x, or time, axis. The steps of displaying the image and checking the height of the vector above the x-axis is repeated for all cells in the image.

One advantage of the present invention is that the apparent display rate can be reduced without increasing the number of images necessary to generate the animated sequence. This reduces the amount of memory that is required by the computer to generate the image. Reduced memory requirements lead directly to reduced cost and complexity of the graphic display system. Another advantage of the present invention is that the apparent display rate changes can assume arbitrarily precise and smooth resolutions. In prior art mechanisms, these rates were restricted to certain multiples of the graphics hardware processing rate-often integral multiples. For example, on a 60 Hz (60 times per second) graphic display system, only rates such as 60 30, 20, 15, 12, 10, 6, 5, 4, 3, 2 and 1 cell per second were allowed. The present invention would support arbitrarily precise rates including, for example, 49.32 or 8.9 cells per second.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

BRIEF DESCRIPTION OF THE DRAWINGS

FIG. 1 is an example of a sequence of graphic cells which make up a complete animated image.

FIG. 2 is a representation of the vector scheme which is used in calculating when to display each cell in the method of the present invention.

NOTATION AND NOMENCLATURE

Figure 3:
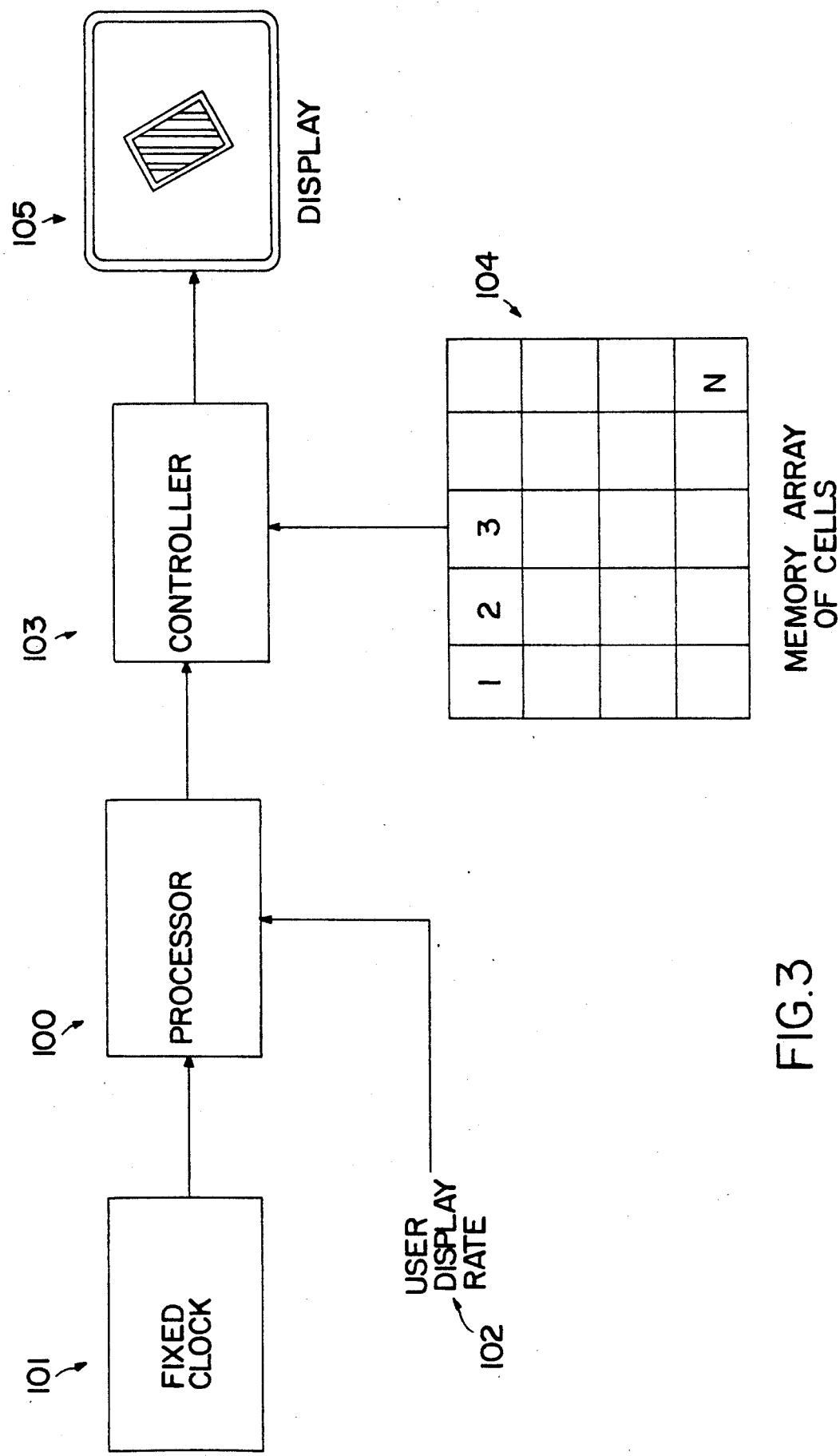
FIG. 3 shows, in block diagram form, an electronic system which employs the present invention.

The detailed descriptions which follow are presented partially in terms of an algorithm and the symbolic representations of operations on data stored within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, and otherwise manipulated. It proves convenient at times, principally for reasons of common usage, to refer to these signals as bits, bytes, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by an human operator. No such capability of an human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

DETAILED DESCRIPTION OF THE INVENTION

A method and apparatus for precisely and smoothly varing the display rate of computer generated graphic images is described. In following description, numerous details such as timing sequences and specific display rates are set forth in order to provide a thorough description of the present invention. In other instances, well known elements, such as processors and memory devices are not described in detail so as not to obscure the present invention unnecessarily.

Referring first to FIG. 1, a sequence of cells which make up an animated image is shown. Each of the cells is collectively referred to by reference numeral 10. As can be seen, the specific animated image shows a square object 12 which is rotating about a central axis. The object 12 which is shown is not the only type of object which may be illustrated by the present invention, and it will be apparent to those skilled in the art that any type of graphic image may be used. There are many different methods which can be used to generate the graphic images. The present invention can be used with any one of these methods. One of the advantages of the present method is that no particular data structure for the images is required. The present invention simply takes the cells 10 and displays them in sequential order at a precisely controlled display rate and cell update rate.

The animated sequence is made up of a finite number of images. Typically, the number of images will be limited by the amount of memory which is available in the computer's memory. After the last image in the animated sequence has been displayed, the sequence is usually repeated starting with the first image. In this way, the user is able to continuously view the object even though only a limited number of cells 10 are present in the sequence. The exact number of images in the sequence will vary according to the desired detail and the amount of memory available in the computer's memory.

Referring next to FIG. 2, the method by which the present invention displays the individual cells 10 of the sequence will be described. FIG. 2 illustrates a vector 20 disposed within the first quadrant of an x,y cartesian plane. In this particular coordinate system the x-axis 17 represents increasing time and is divided up into equal intervals 14, designated $\Delta T$. The preferred embodiment of the present invention utilizes a computer system which displays individual cells on the computer's video display for a fixed interval of time. $\Delta T$ is chosen to be equal to this smallest fixed interval. The divisions 15 along the y-axis 16 represent the frame or cell number of the cells 10 in the animated sequence. Thus, if there are twenty frames in a particular sequence there will be twenty divisions 15 along the y-axis 16. The exact spacing of these intervals will be described below.

The vector 20 is displaced away from the x-axis 17 through an angle theta. This angle represents the display rate. This is so since the trigonometric tangent of theta is the slope of the vector, and the slope, d cell/dt, is proportional to the display rate in cells per second. Theta is scaled such that when it equals 45° the animation sequence is displayed at its fastest possible rate. That is, after each smallest interval of time, $\Delta T$, the next frame 10 in the animation sequence is displayed. Note that if the angle theta was greater than 45° the display would have to operate at a rate faster than the maximum. The way to achieve this is to skip displaying some cells, which is not usually useful or allowed. Thus 45° is chosen as the maximum theta. In the preferred embodiment, the spacing of the divisions 15 along the y-axis 16 is therefore equal in absolute terms to the spacing of the divisions 14 along the x-axis 17. The choice of setting theta equal to 45° when the display rate is at its maximum value is somewhat arbitrary. This particular value is chosen because it greatly simplifies the mathematical calculations which the computer must execute when actually performing the method of the present invention. It will be apparent to those skilled in the art, however, that the same results can be achieved by setting theta equal to a different value at the maximum display rate. If such a different value is used, then the spacing of the divisions 15 along the y-axis 16 will correspondingly change.

When using the present invention, the user inputs the desired display rate to the computer. The computer system converts this display rate into the corresponding angle theta and generates vector 20. This conversion process is best illustrated by an example. Assume that the computer system displays each cell for one-tenth of a second. The maximum display rate for this example would then be 10 cells/second. In this example, when the display rate is 10 frames/second, theta equals 45°. This is the trigonometric arctangent (i.e. inverse tangent) of 1.0. Now, assume that user desires to slow down the display rate to five frames/second. The processor compares the desired display rate with the maximum display rate. Theta is equal to the arctangent of the proportion of the desired display rate to the maximum display rate. In this example, the desired display rate is one half of the maximum display rate. Therefore, theta will be the arctangent of one half, or 26.5°.

After calculating theta, the computer then displays the first cell 10 in the sequence. After a fixed amount of time equal to $\Delta T$ has elapsed, the processor calculates the height of the vector 20 above x-axis 17 (the y coordinate) at the new t (time) value along the x-axis. If the vector 20 is higher than the fixed interval 15 which corresponds to the next animation frame then the computer displays the next frame on the video display. If, however, the vector has not risen above the interval for the next animation frame then the current cell is displayed for an additional $\Delta T$ interval of time. The computer repeats this process until all of the cells in the sequence have been displayed. In this manner some cells will be displayed for more than one interval of time, $\Delta T$. Some will be displayed for exactly one $\Delta T$. None will be skipped or displayed for less than $\Delta T$. As a result, the apparent display rate of the animated image matches the desired display rate. This rate can then be varied to speed up or slow down the animation smoothly and precisely.

Figure 4:
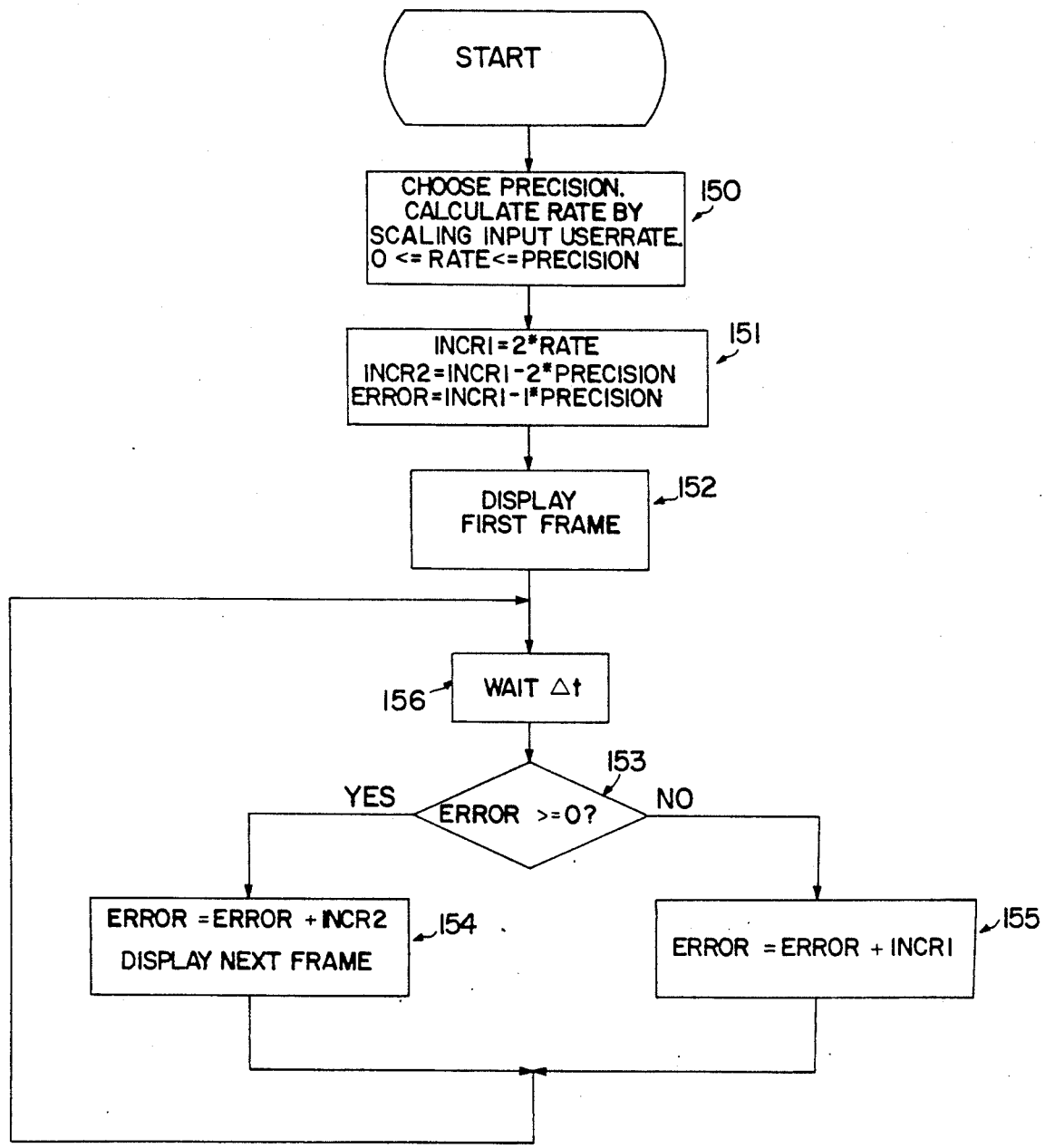
FIG. 4 illustrates a flow chart for a mathematical algorithm used in conjunction with the method of the present invention.

The present invention uses a specialized mathematical algorithm in order to maximize the speed at which the cells 10 can be displayed. This algorithm reduces the amount of memory used by the computer and simplifies the instructions necessary to accomplish the display of the images. By simplifying the types of instructions the computer uses, the required computing time is greatly reduced. Additionally, the simplicity of the algorithmic operations allows it to be implemented in either hardware or software. FIG. 4 is a flow chart of this algorithm.

As can be seen from FIG. 4, the steps involved in the algorithm are relatively strightforward. Before beginning the display process, it is necessary to calculate the value of the constant PRECISION. This is done in step 150. PRECISION, a fundamental constant in the algorithm, is a function of the maximum and minimum display rates of the system, and the amount of variation and precision that is desired. It is with this constant that the invention and algorithm can achieve arbitrarily smooth and precise display rates. Assume that the maximum (fastest) display rate is 30.0 frames per second (fps). Call this parameter MAXRATE. (MAXRATE is also, by definition, equal to $1/\Delta T$.) Assume also that it is desired to be able to vary the display rate in incremental steps of 0.1 fps. Call this incremental parameter STEP. The minimum non-zero (slowest) display rate is chosen to be equal to STEP, or 0.1 fps in this example. Call this parameter MINRATE. There are therefore 300 different and valid display rates between MINRATE and MAXRATE. PRECISION is equal to this value, or $$PRECISION = \frac{MAXRATE}{STEP}$$

Normally, PRECISION will be fixed for any given computer system which uses the present invention. This is because MAXRATE and STEP and MINRATE are usually functions of the hardware used to display the graphic images and are therefore fixed also. However, it will be apparent to those skilled in the art that it is possible to vary PRECISION if the values for MAXRATE and MINRATE or STEP are changed. In fact, it is anticipated that STEP may be changed if a user desires to vary the detail or timing resolution in which the object is viewed. Particular values have been assigned to the appropriate parameters solely for the purposes of this example. It will be apparent to those skilled in the art that the present invention does not require the use of these values and that different values can just as easily be used without departing from the scope of the present invention.

After PRECISION has been calculated, the actual process of displaying the cells 10 can be started. Again, referring to FIG. 4, the user inputs the desired display rate to the computer at step 150. The desired display rate is entered by the user as a number (termed USER RATE) from 0 fps (stopped) to MAXRATE (full speed). The algorithm then converts this value to an integer based on STEP as follows:

$$RATE = \frac{USER\ RATE}{STEP}$$

and this new value is given the designation RATE. In the present example, if the user desired 8.7 frames per second, RATE would be set to 87. At step 151, three variables, INCR1, INCR2 and ERROR are calculated according to the following formulas:

INCR1 = 2* RATE

INCR2 = INCR1 − 2* PRECISION

ERROR = INCR1 − PRECISION

The three variables, PRECISION, INCR1, and INCR2 are global variables and do not change for a given display rate. The term ERROR, however, will be updated each $\Delta T$ interval, and its sign will determine the vector's height above the x-axis and whether the next cell is to be displayed. Steps 150 and 151 correspond to the calculation of the angle theta shown in FIG. 2. After the calculations in step 151, the first cell in the sequence is displayed at step 152.

Control passes to step 156, where the computer waits for an interval of time equal to $\Delta T$. After this wait state, control then passes to step 153, where the value of ERROR is checked. If ERROR is greater than or equal to zero, control proceeds to step 154. At step 154, the next cell in the sequence is displayed (or the first cell is displayed if the current cell is the last in the sequence) and the value of ERROR is adjusted according to the assignment:

ERROR = ERROR + INCR2

If, however, the value of ERROR is less than zero at step 153, then control passes instead to step 155. At step 155, the cell and display number is not updated. Instead, the current cell remains displayed. The value of ERROR is then adjusted according to the assignment:

ERROR = ERROR + INCR1

After the completion of steps 154 or 155, the control loops back to step 156 where the process repeats. Steps 153 through 155 correspond to the process of calculating the height of vector 20 above the x-axis in FIG. 2.

One of the major advantages of this algorithm is its smoothness and arbitrarily high precision. An operator of the computer system can easily manipulate the display rate without any sharp changes or jerks in the animation. Also, the algorithm implementor can vary the constant STEP or PRECISION to allow a wide range of resolutions in the chosen display rates. Also, there are very few mathematical operations which need to be performed in each internal $\Delta T$. All of the computations that are done consist of shifts, addition, and comparisons. There is no multiplication or division to slow down the computer. The algorithm is therefore able to operate quickly and efficiently, either in hardware or in software.

Referring next to FIG. 3, a block diagram of a computer system which employs the method of the present invention is shown. The computer system is comprised of processor 100 which is coupled to clock 101. Clock 101 is used to supply an accurate timing signal to the processor. The processor 100 utilizes this clock signal to generate the specific time intervals, $\Delta T$. The desired display rate is input to the processor from an external device overlying 102. The display rate can be input in a variety of ways. For example, the user may simply use a computer keyboard to enter specific numerical values for the display rate. It is anticipated, however, that an analog input device will most often be used. For example, the user may be provided with a rotatable knob which he turns in order to speed up or slow down the animation sequence as desired. This embodiment is advantageous because it does not require the user to have any specific knowledge concerning the particular display rates used by the computer system. Instead, the user will simply turn the knob in order to change the display rate as he desires. The processor takes the analog signal and converts it into a corresponding digital display rate value. The same results can be achieved through the use of a track-ball or a "mouse" device.

It will be apparent to those skilled in the art that these examples are only a few of the many and different methods which can be used to in order to input the display rate to the processor. Other methods can be used without departing from the scope of present invention.

The processor 100 uses the display rate to calculate when to display each image 10 in the animation sequence. The processor does this using the algorithm described above with reference to FIG. 4. Each time the processor calculates that a new cell 10 is to be displayed, it sends a signal to the controller 103. The controller 103 uses a look-up table, or an equivalent method, in order to decide which frame to display next. The data for the cells are stored in memory 104. As shown in FIG. 3, memory 104 is divided up into separate areas, each of which contains the data for one complete cell 10. The controller selects the appropriate cell from memory 104 and provides it to the display 105. The display 105 then displays the cell to the user until it is instructed to display a new frame by the controller 103.

Figure 5:
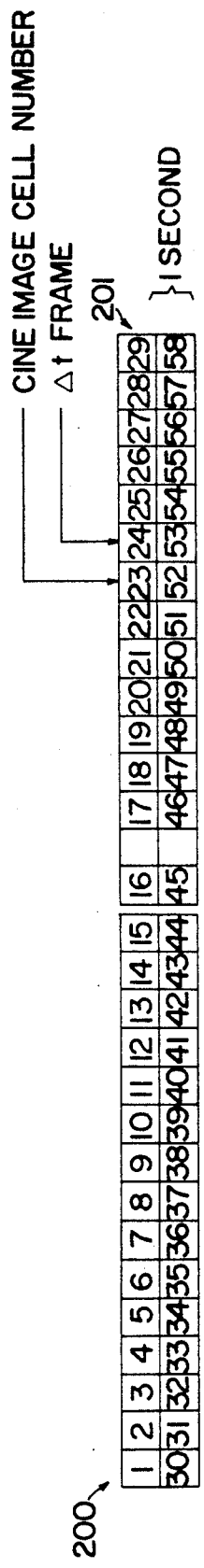
FIG. 5 illustrates how a specific example of individual cells are displayed for a first desired display rate (fast).
Figure 6:
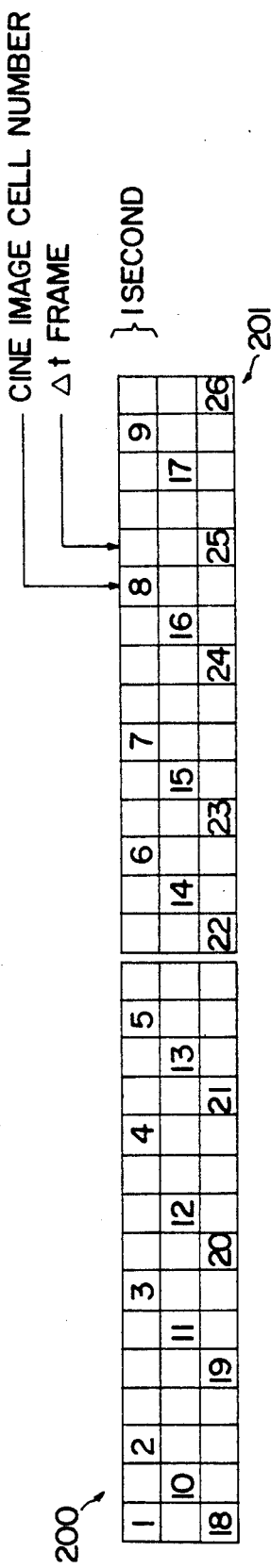
FIG. 6 illustrates how a specific example of particular cells are displayed for a second desired display rate (slow).

In FIGS. 5 and 6, two examples of how individual cells are displayed for specific display rates are illustrated. Both of these examples illustrate an animated image that is made up of 60 cells. While this exact number is used in this example, it will be apparent to those skilled in the art that animation sequences having a larger or smaller number of cells can be used with equal ease. In fact, the following timing patterns for the displayed cells will not change for animation sequences having different numbers of cells. What will change is the cell number of the image which is being displayed. This will become more apparent by reading the description which follows.

In FIGS. 5 and 6, each square 200 represents an interval of time equal to $\Delta T$. One complete row (denoted generally by the numeral 201) of squares represents a fixed unit of time. For convenience, in this example each row 201 represents one second. Of course, each row could just as easily represent a different unit if time, such as two seconds, or one-half second. In FIGS. 5 and 6 there are 30 squares in each row 201. Thus, they illustrate a system which displays each cell 10 for a $\Delta T$ of 1/30th of a second (i.e., at a 30 hertz rate). FIG. 5 illustrates a display rate of 29.0 cells per second and FIG. 6 illustrates a display rate of 8.3 cells per second. Although these specific rates are shown it will be readily apparent to those skilled in the art that different display intervals can be used without the departing from the scope of the present invention.

Since the maximum display rate in this hypothetical system is 30 cells (1/$\Delta T$) per second, and the illustrated display rates are less than this value, the processor selects certain frames which are displayed for more than one display interval, $\Delta T$. In FIGS. 5 and 6 it can be such that a regular pattern emerges with regards to the repeated frames. In FIGS. 5 and 6 each square is either filled with a number or is blank. The numbers represent the sequential cell numbers in a particular animated sequence. Reading from left to right, across the rows, wherever a new cell number is reached, this indicates that the vector 20 (from FIG. 1) is of sufficient height so that a new frame may be displayed. A blank square indicates that the display is not updated during that particular interval, $\Delta T$. Instead, the prior frame continues to be displayed for another $\Delta T$.

Accordingly, a method and apparatus for precisely varying the display rate of computer generated graphic images has been disclosed. In the foregoing description, the invention has been described with reference to specific exemplary embodiments thereof. It will be appreciated that various changes may be made to the specific embodiments without departing from the spirit and scope of the present invention. Some have been described. Others are possible. The foregoing specification, therefore, is to be regarded as illustrative rather than restrictive. The full scope of the present invention is limited only by the following claims.

What is claimed is:

1. A method of precisely varying the display rate of an animated graphic image generated by a computer system, said animated graphic image being comprised of a plurality of graphic cells, said graphic cells displayed in a sequence from first graphic cell 1 to a last graphic cell N, said method comprising the steps of:
   (a) entering a desired display rate into said computer system;
   (b) converting said display rate into a cell display vector located in the first quadrant of an x-y rectangular coordinate system having an x-axis and an y-axis, the x-axis of said coordinate system representing increasing time, the y-axis of said coordinate system representing increasing displayed graphic cell number, said cell display vector being displaced from the x-axis of said coordinate system through an angle, the measure of said angle, being a predetermined function of said desired display rate;
   (c) displaying the first cell of said N cells on a display of said computer system;
   (d) waiting a predetermined period of time;
   (e) calculating the height of said cell display vector above said x-axis, and if said cell display vector is above a predetermined height, displaying the next cell in said sequence;
   (f) repeating steps (d) and (e) until all N cells in said sequence forming said animated graphic image have been displayed.

2. The method of claim 1, wherein after a last image in said sequence has been displayed, a first image in said sequence is displayed after said vector has reached said predetermined height in step (e).

3. The method of claim 1 wherein said cells may be displayed at a maximum rate and said measure of said angle is equal to the arctangent of the ratio of said desired display rate to said maximum display rate.

4. The method of claim 3, wherein said maximum display rate is approximately equal to 30 cells per second.

5. The method of claim 1, wherein said predetermined interval of time is approximately 1/30 of a second.

6. A computer graphic display system capable of varying the display rate of a computer generated graphic image, comprising:
   a clock for generating a series of clock pulses at predetermined intervals of time;
   a central processing unit (CPU) coupled to said clock, said CPU having an output line, said CPU having an input means for entering a desired display rate to said CPU, said CPU converting said desired display rate into a cell display vector located in an x-y rectangular coordinate system having an x-axis and a y-axis, said cell display vector being displayed away from the x-axis of said coordinate system through an angle, the measure of said angle being a predetermined function of said desired display rate, said CPU after each clock pulse calculating the height of said cell display vector above said x-axis, and if said cell display vector is above a predetermined height transmitting an output signal over said output line;
   a controller means coupled to said output line of said CPU, for controlling a sequence of cells which form said graphical image to be displayed, said controller means being coupled to a memory and a video display of said computer graphic display system, said controller means accepting said output signal from said CPU fetching data stored in said memory which represents a single cell of said graphic image and transmitting said cell to said video display, said video display displaying said cell to a user of said computer system.

7. The device of claim 6 wherein said predetermined interval of time is approximately equal to one thirtieth of a second.

8. The device of claim 6 wherein said input means comprises a rotatable knob, said user rotating said knob in a first direction so as to increase said desired display rate, and said user rotating said knob in a second direction so as to decrease said desired display rate.

9. The device of claim 6 wherein said input means comprises a keyboard and said user enters said desired display rate by typing in a number corresponding to said desired display rate.

10. The device of claim 6 wherein said images may be displayed at a maximum display rate and said predetermined function comprises taking the trigonometric arctangent of the ration of said desired display rate and said maximum display rate.

11. The device of claim 6 wherein said maximum value of said angle is 45°.

* * * * *